United States Patent [19]

Yoakam et al.

[11] Patent Number: 4,554,887
[45] Date of Patent: Nov. 26, 1985

[54] APPARATUS FOR COATING TABLETS WITH COMPUTER CONTROL

[75] Inventors: David Yoakam; Robert Campbell, both of Cedar Rapids; Robert Pehkonen, Lisbon, all of Iowa

[73] Assignee: Vector Corporation, Marion, Iowa

[21] Appl. No.: 612,845

[22] Filed: May 22, 1984

[51] Int. Cl.$^4$ ............................................. B05B 15/00
[52] U.S. Cl. .................................... 118/666; 118/692; 118/708; 118/712; 427/212; 427/242
[58] Field of Search ................. 118/19, 303, 666, 692, 118/708, 712; 427/8, 212, 242, 424; 34/46, 50, 54

[56] References Cited

U.S. PATENT DOCUMENTS

| | | |
|---|---|---|
| 212,125 | 2/1879 | Bray . |
| 348,011 | 8/1886 | Henderson, Jr. . |
| 2,308,420 | 1/1943 | Hoopes . |
| 3,141,792 | 7/1964 | Lachman et al. . |
| 3,285,223 | 11/1966 | Sahlin . |
| 3,348,262 | 10/1967 | Heian . |
| 3,357,398 | 12/1967 | Gross . |
| 3,358,302 | 12/1967 | Candor . |
| 3,573,966 | 4/1971 | Hostetler . |
| 3,601,086 | 8/1971 | Hostetler . |
| 3,834,347 | 9/1974 | Motoyama et al. . |
| 4,133,290 | 1/1979 | Melliger ........................... 118/19 X |
| 4,386,471 | 6/1983 | Bowrey ................................. 34/54 |

FOREIGN PATENT DOCUMENTS

| | | | |
|---|---|---|---|
| 53-141968 | 12/1978 | Japan ...................................... 34/50 |
| 1176135 | 1/1970 | United Kingdom ................... 34/50 |
| 1203213 | 8/1970 | United Kingdom ................. 118/19 |
| 2024387 | 1/1980 | United Kingdom ................... 34/50 |

Primary Examiner—Shrive P. Beck
Attorney, Agent, or Firm—Hill, Van Santen, Steadman & Simpson

[57] ABSTRACT

A method and apparatus for coating medical tablets and pellets, for example, which are to be coated with a protective film or wherein an ingredient is to be added or the appearance of the material is to be improved wherein the various parameters which control the production rate which are determined by such variables as the spray rate, the temperature, the coating pan speed, the air flow, dew point, and composition of the spray material are used to calculate the optimum conditions for producing the coated tablets or pellets. The sensed parameters are supplied to a computer which controls the spray rate, the drum speed, the amount of heat and other factors so as to optimize and automatically control the apparatus and method for coating pellets and tablets.

10 Claims, 3 Drawing Figures

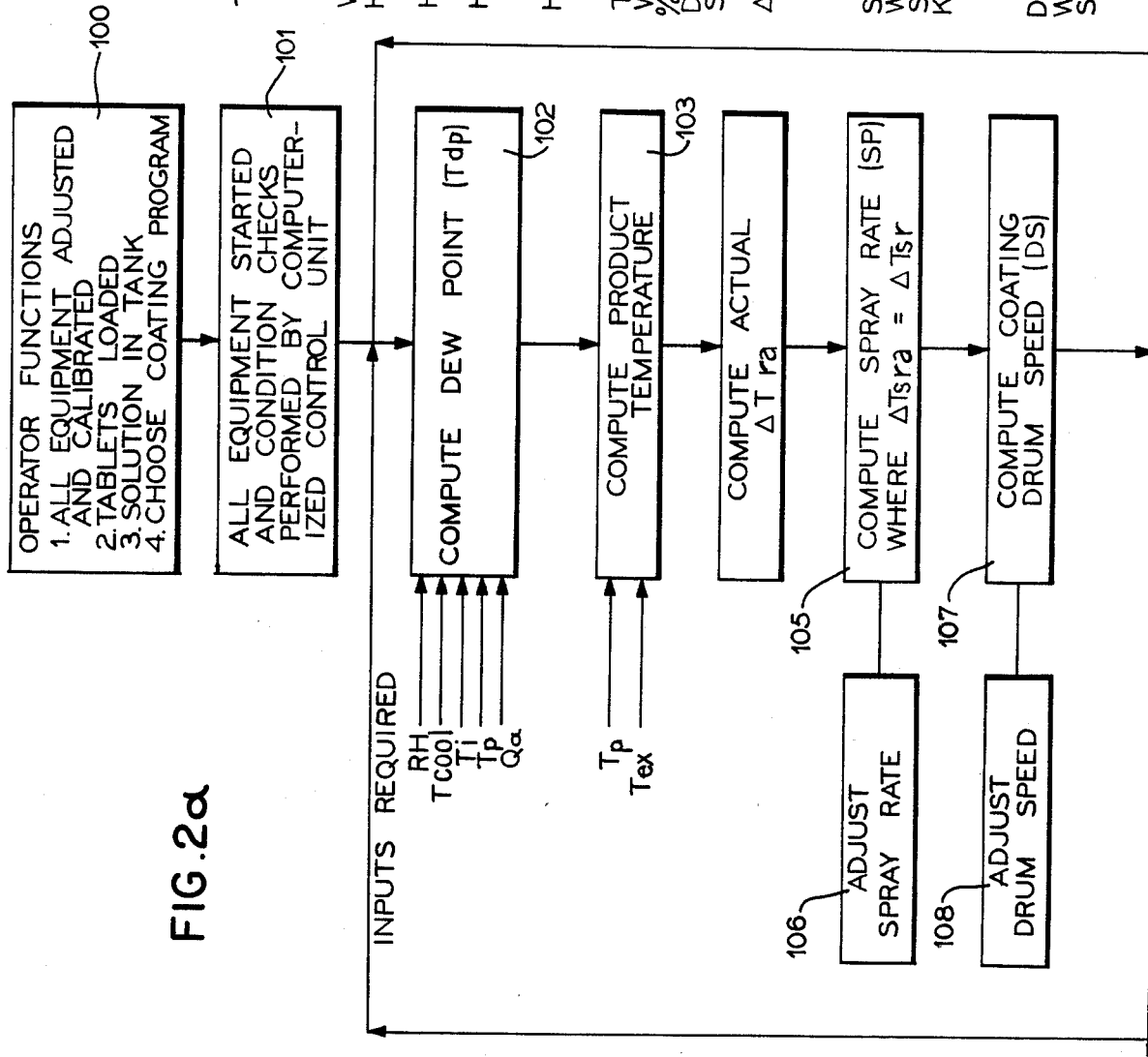

APPARATUS FOR COATING TABLETS WITH COMPUTER CONTROL

BACKGROUND OF THE INVENTION

1. Field of the Invention

This invention relates in general to a control system for coating pellets or tablets with a material which forms a film to protect, add an ingredient or improve the appearance of the pellet or tablet.

2. Description of the Prior Art

Machines are known wherein tablets or pellets are coated with a material to apply a film so as to protect, add an ingredient or improve the appearance of the material wherein the tablets are placed in a rotary drum through which processed air is passed while simultaneously spraying the tablets with a solution comprising solids in a carrier. The processing air is cooled, heated, filtered and/or dehumidified and otherwise conditioned so that it removes the carrier from the solution by evaporation so that only the solid materials remain on the surface of each individual tablet and the tablets are dried so they do not stick together.

Such coating processes of the prior art have been operated by trial and error wherein the equipment is operated such that assumptions are made that constant coating conditions exist and changes in the coating and environment are ignored. For example, the process air is assumed to have the same air flow velocity and dew point at all times and in some installations controls are added to condition the process air and hold it constant. However, none of such prior art controls provide constant coating conditions. In many prior art systems, the process air is heated and controlled on the inlet side of the coating machine but the effects on the coating process when the spray solution is turned on are not reflected in the control of the heated air and, therefore, the coating process is being performed in a state of cooling throughout much of the process.

It has been customary in the past, for an operator to try to adjust on a trial and error basis the various parameters of the system but he generally does not have sufficient information to operate a process in an optimum manner.

SUMMARY OF THE INVENTION

The present invention comprises method and apparatus for providing constant coating conditions on the tablet at the spray interface. The invention reduces the time required to coat the tablets because all of the equipment is used at optimum limits. The system allows the machine to automatically calculate and control the various parameters of the system so that automatic coating occurs. Malfunctions are monitored in the system and corrective action is automatically taken in case of failure so as to protect the batch of tablets from injury or destruction.

In the present invention, when changes in the process air conditions occur the coating conditions are automatically corrected and changed. A printer may be connected to the computer so as to document the parameters which are used to control the various functions of the machine and can also document malfunctions and such documentation is needed only at the beginning of the process and at the end of the process because the system is holding the variables within limits at all other times. If a malfunction occurs, this can also be documented by a printer connected to the computer.

The present invention provides means for scaling to different sizes of coating machines because defined coating variables will be the same for different size machines. These defined variables are useful in connecting the control to a machine of different size.

The present invention requires less development time for a new process where new materials and tablets are to be coated in that it will not be necessary for personnel to learn by trial and error what maximum temperatures or maximum spray rates can be utilized to provide optimum production. The present invention provides a computer which will calculate and automatically control the various parameters in the system.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIGS. 2a and 2b comprise a flow diagram of the invention.

DESCRIPTION OF THE PREFERRED EMBODIMENTS

Figure 1:
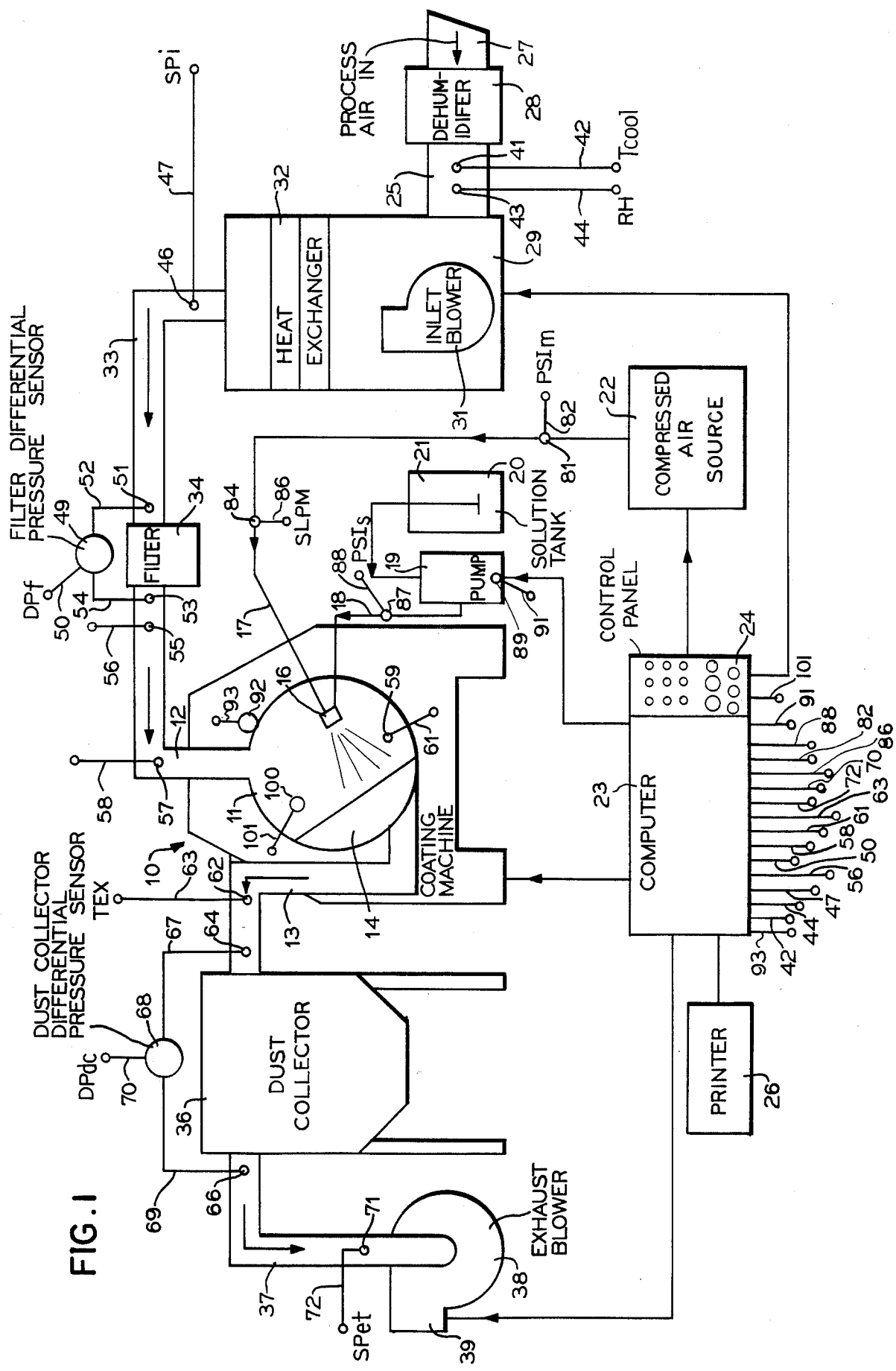
FIG. 1 is a block diagram illustrating the invention.

FIG. 1 illustrates the method and apparatus of the invention which includes a coating machine 10 which has a rotating drum 11 with a bed of tablets 14 which are to be coated. A spray head 16 sprays solution onto the tablets in the bed 14 and receives solution through the conduit 18 and pump 19 which draws from the solution tank 21, the solution 20 which is to be coated. Compressed air is supplied by conduit 17 to the spray head 16 from the compressed air control and reservoir 22.

Process air is supplied to the machine 10 through an inlet conduit 12 and air is drawn through an inlet pipe 27; passes through a dehumidifier 28 into a blower 31 and through a heat exchanger 32 through a conduit 33, a filter 34 and to the inlet pipe 12 of the machine 10. The exhaust air from the machine is supplied to exhaust conduit 13 which is connected to a dust collector 36 which has an outlet conduit 37 that is connected to the exhaust blower 38 which has an exhaust vent 39.

A computer 23 has a control panel 24 with controls and a video screen for indicating various conditions in the system. A printer 26 is connected to the computer to provide printed output under certain conditions.

A temperature sensor 41 is mounted in conduit 25 between the dehumidifier 28 and the pump 31 and measures the cool air temperature. The output of the sensor 41 is connected to a lead 42 which is connected to the computer 23. A cool air humidity sensor 43 is also mounted in the conduit 25 and is connected to a lead 44 which is connected to the computer 23. An inlet static pressure sensor 46 is mounted in the conduit 33 and is connected to a lead 47 which is connected to the computer 23. A pressure sensor 51 is mounted in the conduit 33 and is connected to a filter differential pressure sensor 49 which also receives an input on line 54 from a pressure sensor 53 mounted in conduit 12. The output of the filter differential pressure sensor 49 is applied to lead 50 which supplies an input to the computer 23.

An inlet air temperature sensor 57 is mounted in inlet conduit 12 and is connected to a lead 58 which supplies an input to the computer 23.

A drum air temperature sensor 59 is mounted in the drum 11 of the machine and supplies an output on lead 61 which is connected to the computer 23. An exhaust temperature sensor 62 is mounted in conduit 13 and is connected to a lead 63 which supplies an input to the computer 23. A pressure sensor 64 is mounted in conduit 13 and is connected by 67 to a dust collector differential pressure sensor 68 which also receives an input from a pressure sensor 66 mounted in conduit 37 through input 69. The output of the dust collector differential pressure sensor is applied by lead 70 to the input of the computer 23.

A pan static pressure sensor 100 is mounted inside the rotating drum 11 and connected to the computer by lead 101.

An exhaust static pressure sensor 71 is mounted in conduit 37 and is connected by a lead 72 to the computer 23. The following definitions are utilized in the system:

RH which is the output of sensor 43 is the cool air relative humidity.

$T_{cool}$ is the cool air temperature measured by the sensor 41.

$S_{Pi}$ is the inlet static pressure measured by a sensor 46.

PSim is the compressed air pressure measured by the pressure sensor 81 mounted in the supply line from the compressed air source 22 and which has a lead 82 that is connected to the computer 23.

Qa is the process air flow measured by the sensor 55.

DPf is the differential pressure across the filter measured by the differential pressure sensor 49.

SLPM is the compressed air flow measured by a flow sensor 84 mounted in the air line 17 and which supplies an output on lead 86 to the computer 23.

PSIs is the solution pressure measured by the sensor 87 in the output of the pump 19 and which supplies an input on lead 88 to the computer 23.

RPMpu is the pump speed rpm measured by a sensor 89 and which supplies an output on lead 91 to the computer 23.

RPMdr is equal to the drum speed in rpm and is measured by a sensor 92 which supplies an output on lead 93 to the computer 23.

Ti is the inlet air temperature measured by the sensor 57.

Tp is the drum air temperature measured by the sensor 59 in the drum 11.

Tex is the exhaust air temperature measured by the sensor 62.

SPpn is the pan static pressure measured by sensor 100.

DPdc is differential pressure across the dust collector measured by the sensor 68.

SPex is the exhaust static pressure measured by the sensor 71.

In operation, the material 14 is placed in the rotating coating drum 11 and the process air is drawn through the dehumidifier 28 which removes moisture from the air and is blown by the blower 31 through the heat exchanger 32 where it is heated. The air is then blown through filter 34 and into the coating drum 11 which rotates and continually mixes the tablets 14. The process air passes through the spray of solution which is being applied by the spray head 16 and then through the tablet bed 14 and to the dust collector 36 and exhausted through the exhaust blower 38. Alternatively, the exhausted air may be returned to the system and recycled.

The pump 19 is fed to the spray head 16 through the conduit 18 located within the rotating coating drum 11. Compressed air is fed to the spray head 16 through conduit 17 and creates atomization and the pattern of the solution from the spray head 16.

In the present invention the Computer 23 receives the various above listed inputs from the various sensors and controls the operating conditions of the system such as the on-off state of the blower, temperature of the process air, on-off state of the compressed air, on-off state of the rotating drum, and the on-off state of the pump. The computer makes computation to determine and control the speed of the rotating drum and the rate of solution to be applied.

The sensors which are connected throughout the system measure the parameters which indicate the condition of the system and the output from these sensors are supplied to the computer. The cool air humidity sensor 43, the cool air temperature sensor 41, the process air flow sensor 55, the inlet air temperature sensor 57, the drum air temperature sensor 59 and the exhaust air temperature sensor 62 provide sufficient information to control the process for changes and effects caused by the process air. The drum speed sensor 92 and the pump speed sensor 89 provide information needed to control the drum speed and spray rate. The inlet static pressure sensor 46, the filter differential pressure sensor 49, the compressed air flow sensor 84, the compressed air pressure sensor 81, the dust collector differential pressure sensor 68 and the exhaust static pressure sensor 71 provide condition checks for the system. The sensors used for condition checks also provide rapid response to malfunctions within the system.

This invention is used to produce a consistantly coated tablet (or other material) in conditions that may vary. First the coating conditions have to be defined at the interface between the spray and the tablet which will allow the coating to be consistant.

When a spray of solution (carrier and solids in each droplet of spray) is directed towards a tablet bed, the carrier needs to be evaporated off such that the tablet bed does not become overly wet. For the solids to adhere to the tablet the solution must be partially dried when it first impacts the tablets and the remainder of the carrier is dried on the tablet. In this system the spray will impact the top layer of tablets and because of mixing baffles in the rotating drum, these tablets will be mixed into the bed of tablets where the remainder of the evaporation will occur.

For a coating to be consistant the amount of evaporation before the droplets of spray impact the tablets must be constant. Therefore, a parameter is defined as an incident spray ratio as follows:

$$ISR = \text{Incident Spray ratio} = \frac{\text{amount of spray evaporated on surface of the tablet}}{\text{the total spray rate}}$$

This ratio can be measured using temperature sensors indicated in FIG. 1. If the system has no heat losses from the equipment then:

$$ISR = \frac{T_p - T_{ex}}{T_i - T_{ex}}$$

where:
$T_p$=measured drum air temperature
$T_i$=inlet air temperature
$T_{ex}$=exhaust air temperature In general the above equation will be a good estimate for verifying the ISR parameter during actual operation. The true value for this parameter can be computed as follows to correct for heat losses:

$$ISR_c = \frac{1.944(Q_A)(T_i - T_{ex}) - H_{TR}(.9(T_p + T_{ex}) - 46)}{1.944(Q_A)(T_i - T_p) - H_{AB}(.9(T_i + T_p) - 46 + 1.944(Q_A)(T_i T_p) - H_{TR}(.9(T_p - T_{ex}) - 46)}$$

where $H_{TR} = \dfrac{2.16(Q_A)(T_p - T_{ex})}{(T_p + T_{ex}) - 51}$ = heat loss constant thru the tablet bed in BTU/hr/°F. (measured with no spray)

$H_{AB} = \dfrac{1.16(Q_A)(T_i - T_{ex})}{(T_i + P_p) - 51}$ = heat loss constant above the tablet bed in BTU/hr/°F. (measured with no spray)

$Q_A$=process air flow (CFM) at 78° F. temperature

Next, the rate that the spray dries must be defined with respect to the conditions at the interface of the spray and tablet bed. This can be defined as a temperature differential as follows:

$T_{SR}$=spray product Delta temperature (determines the rate of which the spray dries) =$T_{prod} - T_{dew\,point}$
where
$T_{prod}$=Temperature of product during process.
$T_{dew\,point}$=Dew point temperature of the process air.

By defining one more parameter the coating process can be well defined. Because the tablets are in constant movement the amount that is sprayed on each tablet must be the same to insure uniformity. Because baffles on the coating drum move the tablets thru uniform motions during the coating, the same amount of tablet surface area must pass under the spray per unit time. Therefore a spray rate to drum speed ratio is defined as follows:

SPR=rate of spray applied per unit surface area of tablet bed.

$$= \frac{\text{spray/unit time}}{(\text{drum speed})(\text{spray pattern width})}$$

In order to hold the ISR, $T_{SR}$ and SPR constant a heat transfer coefficient must be known for the system which enables product temperature estimates to be made. This also can be computed from measured parameters and known inputs as follows:

$$HE_{cf} = \frac{76.52(ISR_c)(1 - \% SLD)(SP)}{.5(T_{ex} + T_p) - T_{prod}}$$

where
% SLD=% solids in solution
SP=Spray/Unit time
$T_{prod}$=Average temperature of the tablet bed.

Typically, to develop the coating process the coating system must be measured to define the heat losses $H_{AB}$ and $H_{TR}$ with a tablet bed in the coating drum. Then spray must be applied to a tablet bed such that the coating is acceptable. At that time values for ISR, $ISR_c$, $T_{SR}$, SPR and $HE_{cf}$ must be computed and entered into the computer as constants about which the process will operate. Other data such as % SLD and spray width must also be entered into the computer. Once this information is in the computer the control system will operate the process and optimize the operation in such a manner as to use the equipment efficiently and still retain conditions at the tablet to spray interface at the constant conditions specified by the ISR, $T_{SR}$ and SPR.

Figure 2B:
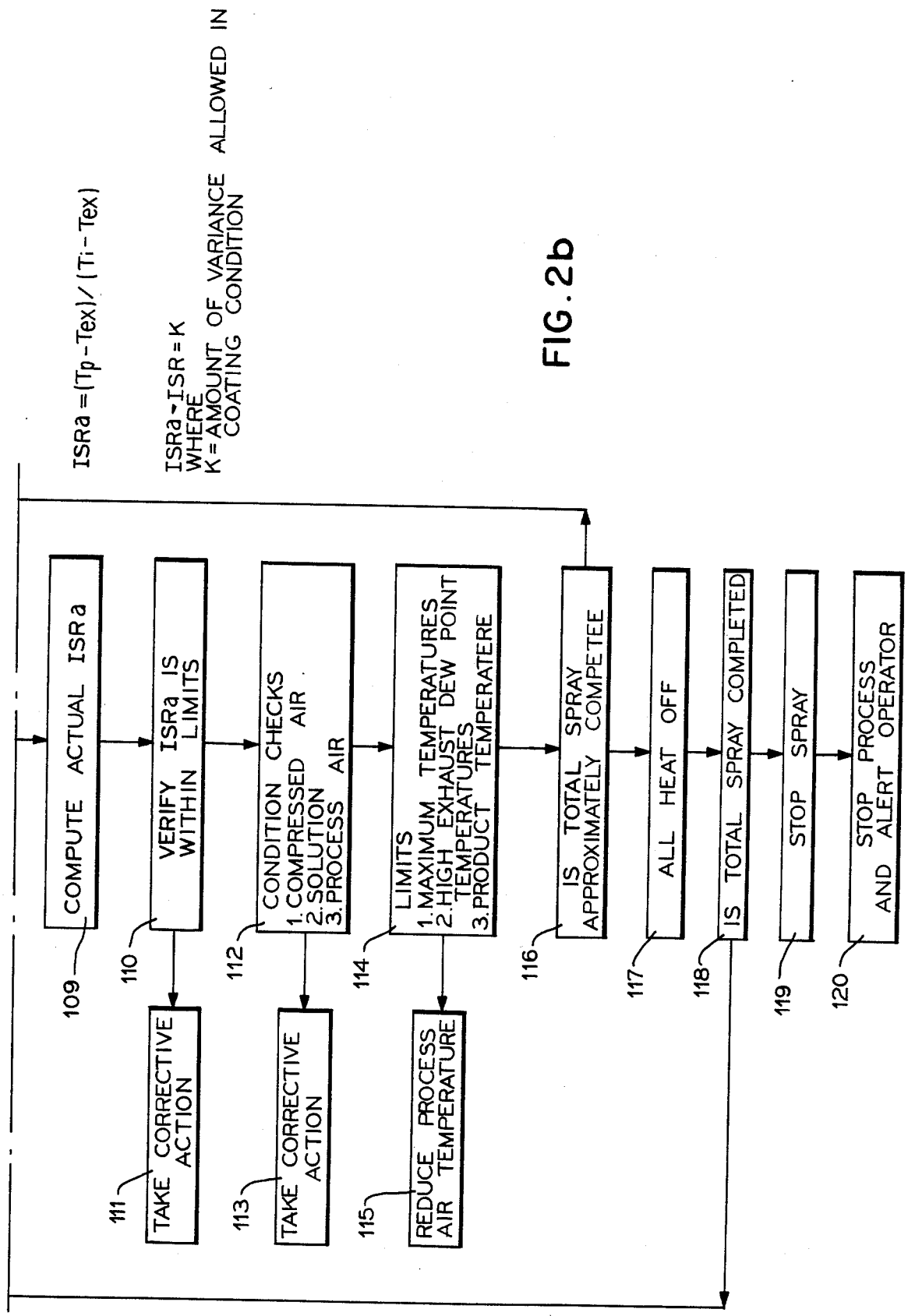

FIGS. 2A and 2B show the basic flow diagram for the optimized coating process. This flow diagram illustrates the basic procedure to do the coating process but does not describe all of the operations in detail (such as turn on exhaust blower, turn on pump etc). To do the coating process the operator must set up items listed in block 100 and once the operator is ready he allows the computer to take control of the system. The computer starts all equipment as indicated in block 101.

Once the equipment is started and the computer reads the sensors the computer then calculates the dew point of the process air at the tablet surface. Next, the product temperature is computed and the actual spray product delta ($T_{SR}$) temperature computed.

A spray rate can now be computed that will force the conditions inside the coating drum to hold the spray product delta at the value desired. The new computed spray rate is then output to the pump.

The drum speed is then computed based on the desired SPR and this value is then output to the coating machine. Next, the approximate ISR (defined as $ISR_A$) value is computed and then compared with the desired ISR. If the $ISR_A$ is not within limits to hold the coating conditions the system will be put in hold condition, the spray stopped and/or an alarm will signal operator of out of design conditions.

If the $ISR_A$ is proper, condition checks are made on the state of all sensors to ensure that the system is proper. Should any of these conditions be improper corrective action is taken which may be a complete shut down of the system.

Next limits imposed on temperature are checked to be sure the system is not working beyond limits imposed by the product or the equipment. Generally, these constraints will cause the rate at which the coating process operates to be limited.

If the amount of spray yet to be applied is less than an amount specified in the computer program the process air heater will be switched off. The remainder of the spray is then applied such that a cooling of the product temperature will occur within the desired coating conditions. This cooling leaves the product ready to be removed from the machine as soon as the spray is complete.

When the total spray has been applied the spray is stopped and the process shutdown and operator signal is then given that the process has been completed.

Attached is a program for the computer for a particular coating process. This program illustrates the manner of operation of the invention and other programs would be utilized for other coating processes.

It is seen that the apparatus and method of the invention allows the complete automatic control of a tablet coating process and although it has been described with respect to preferred embodiments, it is not to be so limited as changes and modifications may be made therein which are within the full intended scope of the invention as defined by the appended claims.

We claim as our invention:

1. Apparatus for coating objects comprising, a machine with a rotating drum in which said objects to be coated are placed, drum driving means connected to said rotating drum, a spray head mounted in said rotating drum for supplying spray to said objects to be coated, air inlet means connected to said machine to supply inlet air to said drum, air outlet means connected to said machine to remove air from said drum, means for supplying spray to said spray head, a computer connected to supply inputs to control said drum driving means and said spray supplying means, and a plurality of sensors for detecting inlet air humidity, temperature and flow rate, drum air temperature and outlet air temperature connected to supply inputs to said inputs to said computer so that it can monitor and control said coating machine, and wherein said means for supplying spray to said spray head includes a fluid reservoir and a pump, said computer connected to control said pump and sensors for measuring pressure and quantity of said fluid supplied to said spray head supplying inputs to said computer so that said computer controls the spray head so as to the time of application of fluid, quantity of fluid applied, the rate of fluid applied to said objects, and time of drying.

2. Apparatus for coating objects according to claim 1 including a heat exchanger connected in said inlet air means and an inlet blower connected in said inlet air means and said computer connected to control said inlet blower.

3. Apparatus for coating objects according to claim 2 including sensors for detecting the temperature and humidity of inlet air before it passes said heat exchanger and said sensors supplying inputs to said computer.

4. Apparatus for coating objects according to claim 3 including a dehumidifier connected in said inlet air means.

5. Apparatus for coating objects according to claim 4 including first filter means through which said inlet air passes and a differential pressure sensor connected across said first filter and supplying an input to said computer.

6. Apparatus for coating objects according to claim 1 including an exhaust blower connected in said outlet air means and said computer connected to said exhaust blower to control it.

7. Apparatus for coating objects according to claim 6 including a second filter connected in said outlet air means and differential pressure sensing means connected across said second filter and supplying an input to said computer.

8. Apparatus for coating objects according to claim 1 including an air source connected to said spray head and said computer connected to control said air source and air pressure and quantity sensors connected to said air source and supplying inputs to said computer.

9. Apparatus for coating objects according to claim 1 including a printer connected to said Computer for providing a print out.

10. Apparatus for coating objects according to claim 1 including alarm means connected to said computer and actuated thereby if the conditions of the apparatus for coating are outside normal conditions or signal completion of coating process.

* * * * *